US008749944B2

(12) United States Patent
Feau et al.

(10) Patent No.: US 8,749,944 B2
(45) Date of Patent: Jun. 10, 2014

(54) ELECTRICAL DISTRIBUTION METHOD AND DEVICE FOR AN AIRCRAFT ENGINE IGNITION SYSTEM

(75) Inventors: Julien Feau, Toulouse (FR); Jean Luc Rivot, La Salvetat Saint-Gilles (FR); Thierry Clavel, Montauban (FR)

(73) Assignee: AIRBUS Operations S.A.S., Toulouse (FR)

( * ) Notice: Subject to any disclaimer, the term of this patent is extended or adjusted under 35 U.S.C. 154(b) by 408 days.

(21) Appl. No.: 13/080,870

(22) Filed: Apr. 6, 2011

(65) Prior Publication Data

US 2011/0242724 A1  Oct. 6, 2011

(30) Foreign Application Priority Data

Apr. 6, 2010 (FR) ...................................... 10 52594

(51) Int. Cl.
*F23Q 3/00* (2006.01)

(52) U.S. Cl.
USPC ........................................................ 361/253

(58) Field of Classification Search
USPC ....................................................... 361/253
See application file for complete search history.

(56) References Cited

U.S. PATENT DOCUMENTS

| | | | |
|---|---|---|---|
| 5,523,691 A * | 6/1996 | Frus ............................... | 324/384 |
| 6,195,247 B1 | 2/2001 | Cote et al. | |
| 7,454,432 B2 * | 11/2008 | Akiyama ............................ | 1/1 |
| 2007/0200352 A1 | 8/2007 | Arguello | |

FOREIGN PATENT DOCUMENTS

| | | |
|---|---|---|
| EP | 1 820 950 A2 | 8/2007 |
| EP | 1 820 950 A3 | 8/2007 |
| WO | WO 99/63212 | 12/1999 |

OTHER PUBLICATIONS

French Preliminary Search Report issued Nov. 11, 2010, in French 10 52594, filed Apr. 6, 2010 (with English Translation of Category of Cited Documents).

* cited by examiner

*Primary Examiner* — Rexford Barnie
*Assistant Examiner* — Tien Mai
(74) *Attorney, Agent, or Firm* — Oblon, Spivak, McClelland, Maier & Neustadt, L.L.P.

(57) ABSTRACT

A device for electrical distribution in an ignition system of an engine of an aircraft provided with a primary electrical supply and a secondary electrical supply, a primary igniter, and a secondary igniter, is provided with an electrical supply system adapted to supply at least one of the igniters alternately via one or the other of the electrical supplies. The electrical supply system is provided with a switch adapted to supply one of the igniters to which it is connected via one or the other of the electrical supplies. A detecting means detects if the igniter that is connected to the switch is also connected to the other electrical supply. The switch may have a relay supplied via one of the electrical supplies so that, in the event of defect of this supply, the igniter to which the switch is connected will be connected to the other electrical supply.

6 Claims, 5 Drawing Sheets

ELECTRICAL DISTRIBUTION METHOD AND DEVICE FOR AN AIRCRAFT ENGINE IGNITION SYSTEM

Figure 1:
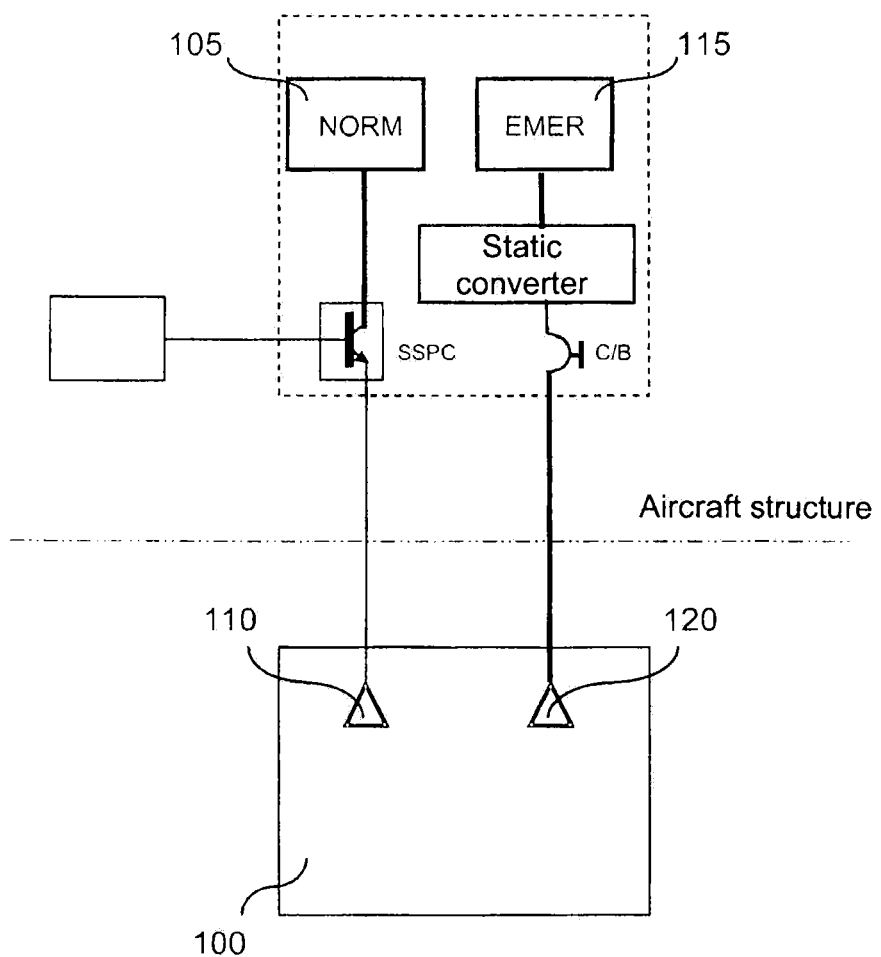

The present invention relates to a method and a device for electrical distribution in an aircraft engine ignition system. It is applicable to the propulsion control system of an aircraft.

It is known that, according to the applicable regulations, a propulsion control system of an aircraft must have a system for restarting an engine:
- based on two igniters provided with two separate electrical supplies, and
- supplied by the emergency electrical supply of the aircraft ("EMER").

For a twin-engine aircraft, these constraints imply the following consequences for the minimum equipment list of igniters:
- the igniter connected to the normal electrical supply ("NORM") is "GO", which means that the aircraft may be authorized to take off without this equipment item,
- under non-ETOPS conditions, the igniter connected to the emergency supply is "GO" on one engine only, except if the EMER supply can be delivered to its backup, or in other words to the other igniter (thus an igniter connected to the EMER supply can be GO, provided that the other igniter is also on the EMER supply),
- under ETOPS conditions, the igniter connected to the EMER supply is "NO GO", meaning that the aircraft may not be authorized to take off without this equipment item, unless the EMER supply can be delivered to its backup.

It is recalled here that the ETOPS conditions begin when a diversion flight has a duration of longer than 60 minutes.

Consequently, the igniters limit the right to have the airplane take off in different manners depending on the electrical supply bus, or in other words the electrical supply source to which they are connected.

The igniters connected to the emergency electrical supply impose more constraints on the airplane's right to take off than do the igniters connected to the normal electrical supply.

Thus, if the igniter supplied by the emergency supply is failing simultaneously with the normal supply, no igniter is able to reignite the engine in case of cut-out.

The present invention is intended to remedy these disadvantages.

For this purpose, according to a first aspect, the present invention applies to a device for electrical distribution in an ignition system of an engine of an aircraft provided with a primary electrical supply and a secondary electrical supply, a primary igniter and a secondary igniter, characterized in that it is provided with an electrical supply system adapted to supply at least one of the said igniters alternately via one or the other of the said electrical supplies.

By virtue of these arrangements, one of the igniters, employed with one of the supplies under normal operating conditions, may also be used when this electrical supply is faulty. For example, the primary igniter may be supplied by the primary electrical supply during normal operation and by the secondary electrical supply in the event of defect of the primary electrical supply.

According to particular characteristics, at least one said electrical supply system is provided with a switch adapted to supply the igniter to which it is connected via one or other of the electrical supplies.

According to particular characteristics, the said switch is provided with a relay supplied by one of the electrical supplies so that, in the event of defect of this electrical supply, the igniter to which the switch is connected will be connected to the other electrical supply.

According to particular characteristics, the device constituting the object of the present invention, such as briefly explained above, is provided with a means for switching the said switch in order to simulate a defect of the electrical supply and a means for detecting if the igniter to which the switch is connected is connected to the said other electrical supply.

By virtue of these arrangements, it is verified that the switch is operational and, if not, its maintenance is initiated.

According to particular characteristics, at least one supply system is provided with a means for remote monitoring of the state of the said switch.

In this way, limitations in the right of the airplane to take off due to a failure of a switch or relay are avoided. This architecture also optimizes the existing characteristics, for example by using an engine interface function, while limiting the modifications to be made to a known architecture.

It is anticipated that the improvement of the right of the airplane to take off is that, under ETOPS conditions (acronym for "Extended range Twin engine aircraft OperationS", for operations of a twin-engine aircraft in extended radius of action), each secondary igniter may be failing while maintaining the primary igniter operational, because it is capable of being supplied by the emergency supply.

According to a second aspect, the present invention applies to an aircraft provided with a device constituting the object of the present invention such as described briefly above.

According to a third aspect, the present invention applies to a method for electrical distribution in an ignition system of an aircraft engine comprising a primary electrical supply and a secondary electrical supply, a primary igniter and a secondary igniter, characterized in that it is provided with a step of supplying an igniter by one supply, a step of detecting a failure of the said supply and, in case of failure of the said supply, a step of supplying the same igniter by the other of the supplies.

According to particular characteristics, the step of supplying the igniter by the other of the supplies includes a step of switching of a switch adapted to supply the igniter to which it is connected via one or the other of the electrical supplies.

According to particular characteristics, the method constituting the object of the present invention includes a step of initiating a test according to a predetermined criterion, a step of switching of the said switch, a step of detecting the supply of the said igniter and, in the absence of supply of the said igniter, a step of transmitting a maintenance message.

According to particular characteristics, the predetermined criterion is a number of flights or a number of flying hours completed since the last step of switching of supply.

Since the advantages, objectives and characteristics of this aircraft and of this method are similar to those of the device constituting the object of the present invention such as briefly described above, they will not be repeated here.

Figure 2:
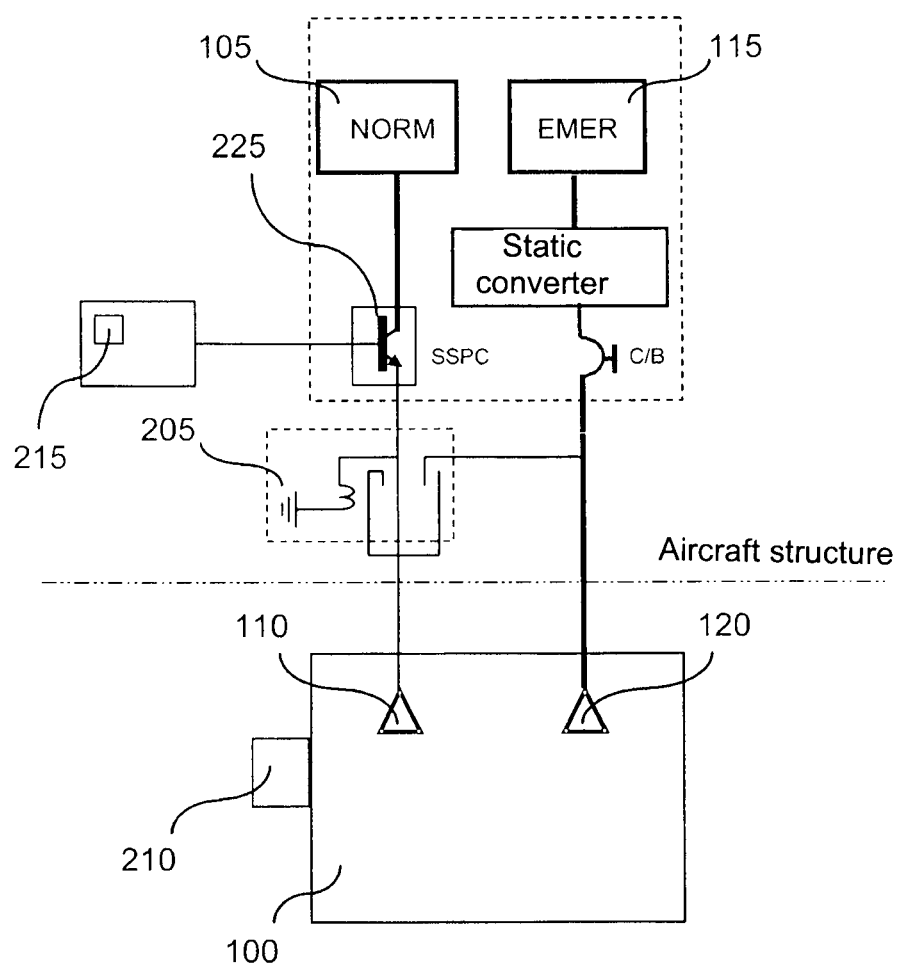
Figure 3:
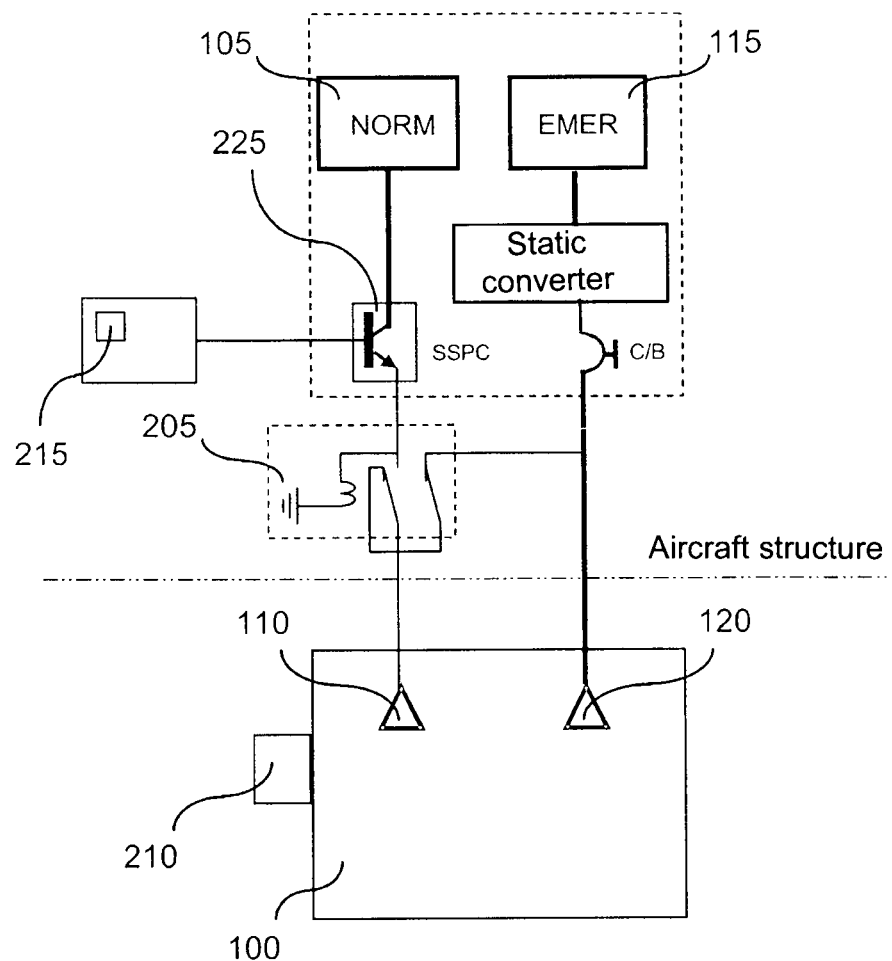
Figure 4:
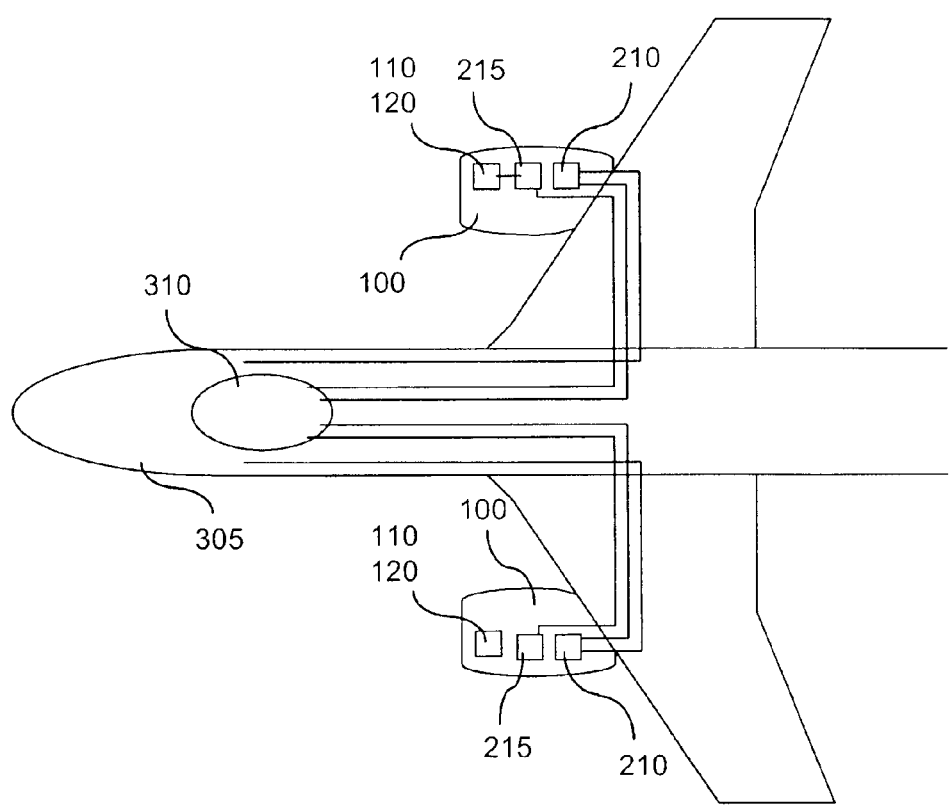
Figure 5:
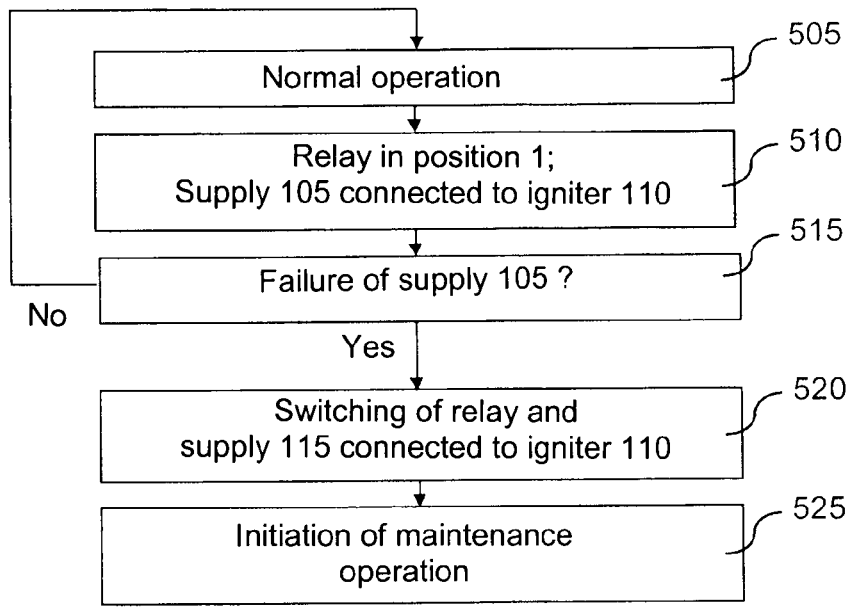
Figure 6:
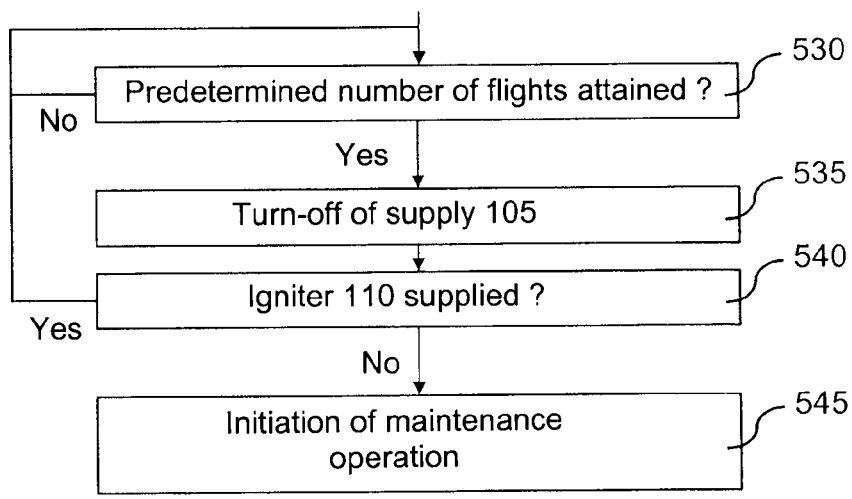

Other advantages, objectives and characteristics of the present invention will become apparent from the description to follow, provided with an explanatory and in no way limitative intent, with reference to the attached drawings, wherein:

FIG. 1 schematically shows a known architecture for supplying igniters in an aircraft, FIG. 2 schematically shows a particular embodiment of the device constituting the object of the present invention, in a first state, FIG. 3 schematically shows the device constituting the object of the present invention illustrated in FIG. 2, in a second state, FIG. 4 schematically shows an installation, in an aircraft, of a device constituting the object of the present invention, and FIGS. 5 and 6 show, in the form of logic diagrams, steps employed in one embodiment of the method constituting the object of the present invention.

FIG. 1 illustrates an architecture of known type for supplying igniters. For each engine 100, it is seen there that a normal or primary supply 105 is connected to a primary igniter 110 and that an emergency or secondary supply 115 is connected to a secondary igniter 120. On the basis of this architecture, the distribution capacities of the igniters are:

primary igniter 110 is "GO",
under non-ETOPS conditions, secondary igniter 120 is "GO" on a single engine and
under ETOPS conditions, secondary igniter 120 is "NO GO".

The defects of this known type of architecture have been mentioned above.

According to the present invention, a different architecture is employed for supplying igniters.

In the particular embodiment illustrated in FIG. 2, there is employed a specific relay installation that makes it possible to switch the emergency electrical supply automatically to each igniter of the same engine in the event of failure of the normal electrical supply.

In addition, this architecture makes it possible to monitor the state of the relays and in this way to avoid limitations of distribution due to a relay failure. This architecture also optimizes the existing characteristics, for example by using an engine interface function, while limiting the modifications to be made.

As illustrated in FIGS. 2 and 3, in one embodiment of the present invention, a relay installation 205 is added to the architecture to switch secondary emergency electrical supply 115 to primary igniter 110.

With this architecture, if each system is operational, relay 205 is in state 1 illustrated in FIG. 2, secondary igniter 120 is supplied by secondary supply EMER 115 and primary igniter 110 is supplied by primary normal supply 105.

In the event of failure of the NORM busbar, in this case electrical supply source 105, relay 205 automatically switches to state 2 illustrated in FIG. 3 and delivers secondary electrical supply EMER 115 to primary igniter 110.

Consequently, if secondary igniter 120 of each engine 100 is inoperative and a cut-out occurs in each engine 100, thus leading to a failure of the NORM busbar, each primary igniter 110 is supplied by secondary emergency electrical supply EMER 115, which permits each engine 100 to be reignited.

Preferably there is additionally employed monitoring of each relay 205 from an engine interface function (or EIF, for "Engine Interface Function") 210, and in this way the operation of relay 205 is monitored in order to avoid any limitation of distribution due to a failure of this relay 205.

Engine interface function EIF 210 and EEC (acronym for Electronic Engine Control, for electronic engine control) 215 regularly perform an automatic test after a predetermined number of flights or flying hours. This test may consist in opening an SSPC (acronym for "Solid State Power Control", for power control by hardware, or digital cut-out circuit) 225 and waiting for EEC 215 to send a status representative of whether primary igniter 110 is supplied or not. If EEC 215 detects that primary igniter 110 is supplied, that means that relay 205 is operational. On the contrary, if primary igniter 110 is not supplied, that means that relay 205 is not operational. In this case, a maintenance message is transmitted by engine interface function EIF 210.

This monitoring makes it possible to avoid detecting a failure of relay 205 only during a failure of secondary igniter 120.

By virtue of the employment of the present invention, good robustness to failures is achieved (up to one inoperative igniter per engine): in the event of failure of emergency bus EMER, one engine can still be reignited in the event of cut-out. In addition, it is not necessary to add a hard-wired electrical line, and the ETOPS conditions do not constitute a restriction for determining the right of the airplane to take off. It is noted that the extra weight due to employment of the present invention may be less than one hundred grams.

FIG. 4 shows that the present invention may be installed in a twin-engine aircraft 305, with an EEC 215 connected to igniters 110 and 120. Furthermore, EEC 215 communicates with EIF 120 via an AFDX network (acronym for "Avionics full duplex", for integral duplex avionics) 310, in order to perform the regular automatic test described above.

Igniters 110 and 120 are connected to EEC 215 on the engine, itself connected to EIF 210 via AFDX 310.

FIG. 5 shows the steps of operation of relay 205. In the course of normal operation of the aircraft, step 505, relay 205 is in the position illustrated in FIG. 2, primary electrical supply 105 supplying primary igniter 110 and secondary electrical supply 115 is supplying secondary igniter 120, step 510.

In the course of a step 515, it is determined if primary electrical supply 105 is faulty. If not, one returns to step 505. If primary electrical supply 105 is faulty, relay 205 passes in the course of a step 520 to the position illustrated in FIG. 3, and secondary electrical supply 115 delivers a voltage to both igniters 110 and 120. Then one passes to a step 525, in the course of which a message is transmitted to signal the need to undertake a maintenance operation for the faulty supply. FIG. 6 shows the test steps during normal operation. After each flight, in the course of a step 530, it is determined, according to a predetermined criterion, if a relay test must be initiated. In a first embodiment, the predetermined criterion concerns a number of flights completed since the last test. For example, the value of a flight counter is incremented for each flight and, in the course of step 530, the value of this flight counter is compared with the predetermined number. If the result is negative, one returns to normal operation for the following flight.

If the predetermined number of flights has been completed, primary electrical supply 105 is turned off by EIF 210 in the course of a step 535. Then, in the course of a step 540, it is determined if primary igniter 110 is under voltage. If yes, one returns to normal operation for the next flight by reinitializing the value of the completed flights counter to "0". If primary igniter 110 is not under voltage, the transmission of a message signaling the need to undertake a maintenance operation for relay 205 is initiated in the course of a step 545.

As a variant, a predetermined number of flying hours is used as the predetermined criterion for initiating the relay test, instead of the predetermined number of flights.

The invention claimed is:

1. An electrical supply system for electrical distribution in an ignition system of an engine of an aircraft provided with a primary electrical supply, a secondary electrical supply, a primary igniter, and a secondary igniter, the electrical supply system being configured to provide electrical supply to at least one of the primary and secondary igniters alternately, via one of the primary and the secondary electrical supplies, the electrical supply system comprising:
- a switch connectable to the primary igniter and the secondary igniter, the switch providing electrical supply selectively to the primary and secondary igniters via one of the primary and the secondary electrical supplies;
- switching means for simulating a defect of the electrical supply of one of the primary and secondary electrical supplies; and
- detecting means for detecting each of the following situations, individually:
  - whether the primary igniter is connected to the secondary electrical supply, and
  - whether the secondary igniter is connected to the primary electrical supply.

2. The electrical supply system according to claim 1, wherein the switch includes a relay supplied by one of the primary and the secondary electrical supplies so that, in the event of defect of said one of the primary and secondary electrical supplies, said one of the primary and secondary igniters, to which the switch is connected, is connected to the other of the primary and secondary electrical supplies.

3. The electrical supply system according to any one of claims 1 to 2, further including means for remote monitoring the state of the switch.

4. An aircraft comprising the electrical supply system according to any one of claims 1 to 2.

5. The electrical supply system according to claim 1, wherein the defect is simulated after a most recent flight of the aircraft and before another flight of the aircraft.

6. The electrical supply system according to claim 1, wherein the defect is simulated prior to failure of either the primary igniter or the secondary igniter.

* * * * *